United States Patent [19]

Castrantas

[11] Patent Number: 4,574,076

[45] Date of Patent: Mar. 4, 1986

[54] REMOVAL OF HYDROGEN SULFIDE FROM GEOTHERMAL STEAM

[75] Inventor: Harry M. Castrantas, Newtown, Pa.

[73] Assignee: FMC Corporation, Philadelphia, Pa.

[21] Appl. No.: 738,651

[22] Filed: Nov. 4, 1976

[51] Int. Cl.$^4$ .................. C01B 17/16; C01B 31/20; B01D 53/44; F03G 7/02
[52] U.S. Cl. .................................. 423/224; 423/232; 423/234; 423/DIG. 19; 60/641.2
[58] Field of Search .................. 159/1 G; 23/272 AH; 55/73; 423/210, 220, 224, 225, 230, 231, 232, 234, 235, 522, 561 R, 563, 566, 557; 210/42 R, 52, 59, 62 R; 60/641

[56] References Cited

U.S. PATENT DOCUMENTS

| | | | |
|---|---|---|---|
| 3,733,393 | 5/1973 | Couillaud et al. | 423/522 |
| 3,911,080 | 10/1975 | Mehl et al. | 423/220 |
| 3,949,055 | 4/1976 | Schneider et al. | 423/224 |
| 3,953,578 | 4/1976 | Thirion | 423/522 |
| 3,969,479 | 7/1976 | Lonnes et al. | 423/224 |

FOREIGN PATENT DOCUMENTS

| | | | |
|---|---|---|---|
| 829372 | 11/1975 | Belgium. | |
| 421970 | 1/1933 | United Kingdom | 423/220 |
| 1152705 | 5/1969 | United Kingdom | 423/224 |

OTHER PUBLICATIONS

Schumb, W. C. et al., Hydrogen Peroxide Reinhold Publishing Co., NY, NY, 1955, pp. 399, 432, 436.
FMC Pollution Control Release #8, Oct. 73.
Castrantas, H. M., et al., "Hydrogen Sulfide Abatement at Geothermal Wells, presented at Geothermal Enviroment Seminar, sponsored by Lake County, California Air Pollution Control Board, Oct. 28 76.

*Primary Examiner*—Gary P. Straub
*Attorney, Agent, or Firm*—Frank Ianno; Eugene G. Seems

[57] ABSTRACT

A process for removing hydrogen sulfide from saturated steam is described whereby the steam and hydrogen sulfide entrained therein are contacted under conditions of turbulent flow with hydrogen peroxide. The effectiveness of the process is improved by simultaneously contacting the steam with a basic reagent such as sodium hydroxide.

15 Claims, No Drawings

REMOVAL OF HYDROGEN SULFIDE FROM GEOTHERMAL STEAM

This invention relates to the removal of hydrogen sulfide from steam and to the removal of hydrogen sulfide, carbon dioxide and boric acid from geothermal steam before the steam is released into the atmosphere. More particularly, this invention relates to a process for oxidizing hydrogen sulfide entrained in geothermal steam in a simple and convenient manner.

With the decreasing availability of fossil energy sources, geothermal steam has assumed increased importance. Exploration has opened up new fields, and known fields are being rapidly developed by drilling new wells. During the actual drilling of the well and until the well is finished and tested, the steam is generally vented to the atmosphere through a muffler to abate noise. After the well is brought in and the particulate matter that is present in steam from new wells is blown off, the geothermal steam is conveyed through pipes that are usually laid on the surface of the ground to the steam turbines of a power generating plant.

Geothermal steam contains non-condensable gases including carbon dioxide, hydrogen sulfide, hydrogen, methane, nitrogen, ammonia and boric acid. Most geothermal steam turbines are equipped with direct contact condensers which complicates environmental control because they provide two pathways for the effluent to return to the environment. At the Geysers California high pressure steam field, the steam usually contains between 110 and 572 parts per million (ppm) hydrogen sulfide. Pollution of the environment by hydrogen sulfide has been offensive to communities surrounding the polluting source because of its noxious presence in the atmosphere and because of its harmful effect on natural habitat.

Many processes have been proposed for removing hydrogen sulfide from gaseous effluents. One of the earliest methods was the incineration method. In this method, toxic hydrogen sulfide is converted to less toxic and less offensive sulfur dioxide and sulfur trioxide by air oxidation at high temperatures. While this process converts hydrogen sulfide into sulfur dioxide, the sulfur dioxide is still noxious and potentially dangerous to the environment.

To avoid the problems associated with the incineration method, numerous chemical processes have been suggested. U.S. Pat. No. 3,716,620 discloses the oxidation of hydrogen sulfide and thiols with iodine in the presence of an organic solvent. While this process is technically effective in oxidizing hydrogen sulfide, the process is not commercially feasible because the compounds used are expensive and even small losses of these compounds make the process commercially uneconomical.

British Pat. No. 421,970 discloses a four-stage process for oxidizing hydrogen sulfide with hydrogen peroxide. In the first stage, hydrogen sulfide is absorbed in an alkaline solution. In the second stage, the solution is acidified by treatment with carbon dioxide. In the third stage, the solution is boiled to expel most of the absorbed hydrogen sulfide. In the fourth stage, the solution is treated with an oxidizing agent to oxidize the remaining hydrogen sulfide. While the patentee states that a tenfold reduction of hydrogen sulfide in the scrubber effluent is achieved in fifteen minutes, this process is not a commercially feasible process, primarily because of the time necessary to perform the complete process.

In copending U.S. application Ser. No. 472,602, filed May 23, 1974, (Belgian Pat. No. 829,372, issued Nov. 24, 1975) there is described a method for simultaneously absorbing and oxidizing sulfur-containing gases present in a waste gas stream by contacting the waste gas stream with aqueous hydrogen peroxide solution in a packed column such as a packed bed or tower. The waste gas stream and contacting solution may be fed into the contactor either counter-currently, cross-currently or co-currently. The treated waste gas and spent aqueous hydrogen peroxide solution are then discharged directly into the environment.

Recently, hydrogen sulfide removal from geothermal steam has been improved with successful testing of the Stretford process, adopted from a similar application in the coal gas industry. The Stretford process depends on scrubbing the gas with suitable solvents, with subsequent catalytic oxidation.

It is apparent from these prior art processes that there has been a long felt need for a commercially effective, efficient and simple process capable of rapidly removing hydrogen sulfide from geothermal steam in a simple and convenient manner without the formation of by-product pollutants.

In accordance with the present invention, there is provided a process for oxidizing the hydrogen sulfide present in steam wherein the hydrogen sulfide containing steam is contacted at saturation temperatures under conditions of turbulent flow with hydrogen peroxide. Surprisingly, the efficiency of this process increases markedly when the steam is saturated. Above the saturation point, it is desirable to carry out the oxidation of hydrogen sulfide present in superheated steam with hydrogen peroxide in the presence of a strong base such as an alkali metal hydroxide.

The process of this invention permits the removal of essentially all of the hydrogen sulfide present in geothermal steam to below levels detectable by conventional methods within a matter of a few seconds. Furthermore, the hydrogen sulfide is oxidized to non-polluting elemental sulfur and sulfates. These substances may be discharged directly into natural waterways without harm to natural fauna or flora.

While the process to be described is particularly useful in the treatment of geothermal steam, it also finds application in the treatment of industrial waste gas streams that contain hydrogen sulfide and water vapor.

In one embodiment of the present invention, aqueous solutions of hydrogen peroxide and a suitable base, e.g., sodium hydroxide, potassium hydroxide, potassium carbonate or soda ash, are injected, preferably as separate streams, directly into a steam line to abate atmospheric sulfide and any ensuring waste water sulfide. The process differs from normal scrubbing with caustic followed by peroxide treatment or scrubbing with a hydrogen peroxide-caustic solution, as will be explained.

In normal scrubbing, thorough and intimate contact between a gas and a recirculating scrubbing solution occurs. This is usually carried out by contacting a gas with a counter-current spray or series of sprays of the scrubbing solution or by using a packed bed to increase the gas to liquid contact. The scrubbing liquid is then separated from the gas stream and recirculated for additional contact.

In the present invention, the hydrogen peroxide and the base are injected directly into the steam line, preferably in the form of a spray, although thorough gas contact with a liquid spray is not necessary for the process to work effectively. The steam provides the unique medium whereby the sulfide reacts with the hydrogen peroxide and caustic solutions. The small amount of the injected additives are removed downstream with other condensates and solids and disposed of. Injecting a narrow stream rather than a spray of hydrogen peroxide and caustic solutions is adequate and results in high abatement of hydrogen sulfide. The effectiveness of the process of the present invention was unpredictable as excessive hydrogen peroxide decomposition would be expected to occur because of:

(1) high steam temperatures;
(2) contact with the interior of the mild steel pipe employed to transport the steam; and
(3) side reactions with other steam components such as ammonia and methane.

The effectiveness of the process is independent of the concentration of hydrogen sulfide present in the geothermal steam. Generally, the hydrogen sulfide gas present is source dependent and can vary from less than 1 ppm to as much as several thousand ppm.

It has been noted that, although the direct injection of hydrogen peroxide into the geothermal steam at a point near the well head is effective, the reaction rate is dramatically increased when the hydrogen peroxide is injected at a point downstream where the steam has expanded and becomes saturated. The injection of a basic reagent concurrently with the hydrogen peroxide also increases the reaction rate and is required when the steam is superheated. When removing hydrogen sulfide from superheated steam, sufficient alkaline reagent should be injected so that the condensate has a pH in the range of from above 7.0 to about 13.5. Although a weak base such as ammonium hydroxide may be employed as the alkaline reagent, the preferred reagent is an alkali metal hydroxide such as sodium hydroxide, potassium hydroxide or lithium hydroxide which may be replaced in whole or in part by magnesium hydroxide, calcium hydroxide, sodium carbonate, sodium bicarbonate, trona ore, potassium carbonate, and potassium bicarbonate.

In the practice of the present invention, any available grade of aqueous hydrogen peroxide can be employed, with a highly stabilized hydrogen peroxide being preferred. The exact quantity of hydrogen peroxide injected into the geothermal steam depends upon the concentration of the hydrogen sulfide present in the steam and the extent to which hydrogen sulfide is to be removed.

Experiments show that the percent of hydrogen sulfide abatement may be controlled at will by adjusting the hydrogen peroxide to hydrogen sulfide mole ratio and/or the sodium hydroxide to hydrogen sulfide mole ratio. The molar ratio of hydrogen peroxide to hydrogen sulfide may vary from 0.5:1 to 30:1. Particularly preferred is a molar ratio of hydrogen peroxide to hydrogen sulfide in the range of 4:1 to 8:1. The molar ratio of base to hydrogen sulfide may vary from 0.2:1 to 30:1. The oxidation of hydrogen sulfide is particularly effective if the base is injected at a ratio of 2:1 to 8:1.

Although hydrogen peroxide is the preferred oxidizing agent, other peroxygen compounds such as sodium carbonate peroxide, sodium perborate, sodium pyrophosphate peroxide, urea peroxide, and sodium peroxide are effective when dissolved in water and injected into the steam. As indicated above, the preferred alkaline reagents are the alkali metal hydroxides such as sodium hydroxide, and potassium hydroxide. Other alkaline reagents are also effective, among them ammonium hydroxide, and solutions of sodium carbonate, potassium carbonate, sodium bicarbonate, potassium bicarbonate, calcium hydroxide, magnesium hydroxide, sodium peroxide and sodium carbonate peroxide.

Inasmuch as detonation may occur if hydrogen peroxide containing over 55 weight percent $H_2O_2$ is contacted with organic matter, desirable concentrations of hydrogen peroxide for use in the present process are about 35 weight percent to 50 weight percent hydrogen peroxide.

Sodium hydroxide and potassium hydroxide are commercially available as 50 weight percent solutions and may be conveniently used in the process of the present invention as supplied.

The hydrogen peroxide, and the basic reagent when used, may be injected into the conduit at any place downstream of the well head but the two reagents are preferably introduced in close proximity to one another to obtain the advantage provided by the turbulent flow of the steam which mixes the reagents and assures contact with the hydrogen sulfide. Although the hydrogen peroxide and basic reagent may be mixed prior to injection, it is desirable to introduce the two reagents separately to avoid the decomposition of hydrogen peroxide that occurs under basic conditions. Thus, the hydrogen peroxide and basic reagent may be introduced into the conduit through separate orifices in close proximity to each other, as a spray or stream.

Although the hydrogen peroxide and alkaline reagent may be injected intermittently, excellent mixing is obtained when the hydrogen peroxide solution and solution of basic reagent are simultaneously injected into the conduit carrying the steam as impinging or opposing streams or sprays co-current with the direction of steam flow or transverse to the direction of steam flow. The alkali reagent is preferably injected at a rate that maintains the pH of the geothermal steam condensate in the range of about 8 to about 13.5 and most preferably between about 8.0 and about 11.

To reduce the hydrogen sulfide present in geothermal steam to non-detectable limits, hydrogen peroxide may be employed in concentrations of about 0.01% to 50% by weight. The stoichiometry of the oxidation of hydrogen sulfide by hydrogen peroxide would indicate that four parts by weight of hydrogen peroxide are needed to completely oxidize one part by weight of hydrogen sulfide. However, to compensate for decomposition losses, amounts of hydrogen peroxide slightly above the stoichiometric amount may be employed to oxidize all of the hydrogen sulfide.

The use of hydrogen peroxide in an alkaline environment to oxidize hydrogen sulfide present in geothermal steam is completely unexpected because hydrogen peroxide is known to decompose under alkaline conditions. It has been discovered, however, that the oxidiation rate of hydrogen sulfide is significantly faster than the hydrogen peroxide decomposition rate when hydrogen peroxide is employed in stoichiometric amounts or in amounts slightly above the stoichiometric amount.

The time necessary to completely oxidize the hydrogen sulfide in geothermal steam with hydrogen peroxide in the presence of a basic reagent is 1-4 seconds. Conventional metal catalysts may also be employed to assist the oxidation reaction. These catalysts include salts of iron, cobalt, nickel, copper, manganese, molybdenum, vanadium, platinum, palladium, and silver. If a catalyst is employed, the first four catalytic salts are preferred. The catalyst can be employed with or without conventional complexing agents such as glutonic acid and citric acid, sodium tripolyphosphate, ethylene diamine tetraacetic acid and the salts thereof. The use of a catalyst, however, is not necessary for the reaction between hydrogen sulfide and hydrogen peroxide.

The reaction temperature and pressure are critical only to the extent that, as observed above, the hydrogen sulfide is oxidized by hydrogen peroxide much more rapidly if the steam is saturated. For this reason, in power plant operation, it is desirable to introduce the hydrogen peroxide and basic reagent downstream but close to the turbine, in the turbine chamber, or vent stack.

As indicated above, when bringing in a new well, the geothermal steam is normally vented to the atmosphere through a muffler to reduce the noise. Under these circumstances, injection of hydrogen peroxide and an alkaline reagent into the blooie line upstream of the muffler will oxidize the hydrogen sulfide. The quantity of hydrogen peroxide and basic reagent injected into the blooie line may be controlled with positive displacement pumps and monitored by analyzing the condensate from the muffler for alkali and residual hydrogen peroxide. Commercially available gas analyzers may be used to analyze the hydrogen sulfide gas content of the vented steam.

In employing the process of the present invention to control the hydrogen sulfide emissions from a commercial steam generating plant, the hydrogen peroxide and alkaline reagent are injected into the steam upstream or downstream of the turbine or directly into the turbine chamber. Again the precise amount of reagents injected to obtain the desired degree of hydrogen sulfide abatement may be controlled by continuous or intermittent analysis of the vented steam and condensate for hydrogen sulfide, hydrogen peroxide and alkalinity.

When geothermal steam is used to power a generating plant, the wells are not shut down during maintenance work on the plant or turbines, as any interruption of steam flow would result in the accumulation of solids and serious abrasion of the turbines for an appreciable time after the wells are brought back into operation. Accordingly, the geothermal steam is bypassed during maintenance on the generating plant and vented directly to the atmosphere through large mufflers. The process of the present invention is extremely effective in preventing pollution of the atmosphere with hydrogen sulfide during such periods of plant maintenance or shut down. The hydrogen peroxide alone, or hydrogen peroxide and alkaline reagent are injected into the steam at the entrance to the muffler.

One surprising aspect of the inventive process is the fact that a strong alkali such as sodium hydroxide is more effective in reducing the hydrogen sulfide content of geothermal steam than a weaker basic reagent such as ammonium hydroxide. This was completely unexpected as several factors were believed to mitigate against the successful operation of such systems; namely:

(1) high peroxide decomposition losses due to high pH of the caustic solution present;
(2) the rapid migration of sodium hydroxide to the walls of the mild steel steam pipe, severely reducing contact of the caustic with the hydrogen sulfide gas. The sodium hydroxide not being volatile was expected to rapidly become ineffective after entering the steam line.

The use of hydrogen peroxide alone in the absence of an alkaline reagent results in corrosion of mild steel which corrosion is reduced by the addition of an alkaline reagent intermittently or simultaneously with the hydrogen peroxide.

The following examples further illustrate the invention. All percentages given are based upon weight unless otherwise indicated.

EXAMPLE I

Hydrogen sulfide is oxidized at pH 7-8 with hydrogen peroxide by passing dilute solutions of hydrogen sulfide and hydrogen peroxide through a vaporizer into a glass reaction tube two feet in length and one inch in diameter.

The hydrogen sulfide solutions are prepared by bubbling hydrogen sulfide gas through water to produce separate solutions, each containing 12.5 ppm and 27.1 ppm of hydrogen sulfide and adjusting the pH to 7-8 with dilute ammonium hydroxide. The hydrogen peroxide solutions are prepared by diluting 35% by weight hydrogen peroxide with dionized water to provide solutions containing 48 and 90 ppm separately of hydrogen peroxide. The two foot reaction tube terminates in a glass flask surrounded by dry ice to condense the steam and stop the oxidation reaction.

To test the effect of mild steel on the decomposition of hydrogen peroxide, a mild steel pipe was inserted into the glass reaction tube for selected experiments. Flow rates of the hydrogen peroxide and hydrogen sulfide solutions are adjusted to simulate the 3-4 second residence time that is found in actual geothermal field situations. The sulfide content is determined on the condensate immediately after each run using a methylene blue test kit. Hydrogen peroxide assays are carried out using a spectrophotometer with o-toluidine reagent.

The results are summarized in Table I, and show that in the absence of mild steel, a substantial quantity of hydrogen peroxide remains stable within the 3-4 second reaction time. (Table I, Runs A-B). Mild steel, however, results in high hydrogen peroxide decomposition losses (Table I, Runs C-I).

A significant improvement in the hydrogen sulfide abatement results when the temperature of steam is lowered to the saturation temperature of 100° C. at 760 millimeters Hg (Table I, Run E).

The temperature in geothermal steam line cannot always be conveniently controlled, but it is apparent from Table I

TABLE I

| Run No. | mg/l $H_2O_2$ | $H_2S$ Charged | Mole Ratio $H_2O_2/H_2S$ | Average Temperature °C. | Residence Time Seconds | % $H_2O_2$ Decomposition | % $H_2S$ Abatement* | Reactor Tube Construction |
|---|---|---|---|---|---|---|---|---|
| A | 48 | — | 1/0 | 146 | 3-4 | 24 | — | glass |
| B | 48 | 12.5 | 3.8/1 | 146 | 3-4 | 24 | 26.4 | glass |
| C | 48 | — | 1/0 | 122 | 3-4 | 96 | — | glass-mild steel |
| D | 48 | 12.5 | 3.8/1 | 156 | 3-4 | 97 | 20 | glass-mild steel |

TABLE I-continued

| Run No. | mg/l $H_2O_2$ | $H_2S$ Charged | Mole Ratio $H_2O_2/H_2S$ | Average Temperature °C. | Residence Time Seconds | % $H_2O_2$ Decomposition | % $H_2S$ Abatement* | Reactor Tube Construction |
|---|---|---|---|---|---|---|---|---|
| E | 48 | 12.5 | 3.8/1 | 100 | 3–4 | 98 | 82 | glass-mild steel |
| F | 48 | 12.5 | 3.8/1 | 195 | 3–4 | 100 | 0 | glass-mild steel |
| G | 48 | 12.5 | 3.8/1 | 128 | 3–4 | 99.6 | 32 | glass-mild steel |
| H | — | 12.5 | 0/1 | 128 | 3–4 | — | 0 | glass-mild steel |
| I | 90 | 27.1 | 3.3/1 | 165 | 3–4 | 99.6 | 44 | glass-mild steel |

*Adjusted to pH 7–8 with $NH_4OH$ that injection of hydrogen peroxide into steam at the saturation point will enhance the hydrogen sulfide abatement.

EXAMPLE II

A one liter Erlenmeyer flask containing 500 ml of a 0.283 weight percent sodium sulfide solution adjusted to pH 7 is covered loosely with a piece of aluminum foil to permit steam to escape from the flask while preventing spray from entering the flask. An 18 inch long, 2 inch ID diameter heated glass tube is placed over the flask in a vertical position and the hydrogen sulfide solution is heated to the boiling point.

A spray of dilute hydrogen peroxide is directed downward from a position approximately 1 inch above the top of the vertical tube. The degree of hydrogen sulfide abatement is established by placing Drager tubes over the steam vent before and during the spraying operations.

Excellent abatement of the hydrogen sulfide with hydrogen peroxide is achieved by this spraying technique in those experiments summarized in Table II.

TABLE II

Effect of Spraying Dilute $H_2O_2$ Solution Into Rising Steam Vapors Containing $H_2S$

| Run No. | $H_2S$ mg/l | $H_2O_2$ mg/l | Mole Ratio $H_2O_2/H_2S$ | %* Atmospheric $H_2S$ Abatement |
|---|---|---|---|---|
| 1-A | 79 | 477 | 6/1 | 80.8 |
| 2-A | 79 | 477 | 6/1 | 52.5 |
| 3-A | 79 | 477 | 6/1 | 93.3 |

*By Drager Test

This example establishes that hydrogen sulfide may be removed from geothermal steam by directing a hydrogen peroxide spray upward or downward into a drilling muffler or into a power plant vent stack where the condition of steam saturation is satisfied.

EXAMPLE III

The use of hydrogen peroxide in removing hydrogen sulfide from geothermal steam was evaluated in a field trial on a pilot plant scale. Two and three-tenths inch ID mild steel, Schedule 40 piping is used for the muffler blooie line construction except for a three foot section of type 316 stainless steel pipe. This stainless steel pipe is placed at the chemical injection point to minimize iron catalyzed peroxide decomposition. Mixing of the chemical spray with the steam was improved with a venturi possessing a 0.30 inch throat installed a few feet downstream from the chemical injection point. The steam flow is measured by a Barton differential flowmeter. The hydrogen peroxide and alkali solutions are metered by positive displacement pumps. Spray heads positioned within the stainless steel section of the pipe deliver a stream or spray (depending on the flow rate) of hydrogen peroxide or hydrogen peroxide and alkali reagent solutions. In the preferred configuration, the spray head is directed downstream parallel to the steam flow.

Atmospheric hydrogen sulfide is routinely determined at the muffler outlet by drawing steam vapor through a Drager tube for 15 seconds. Sulfides in the muffler condensate are determined with a Lamott-Pomeroy Model CC PS 4630 kit based on methylene blue development. The total hydrogen sulfide in the steam is determined by condensing a side stream of the steam. In order to condense the side stream, a slight back pressure is needed. This is achieved

TABLE III

Field Trial on $H_2S$ Abatement in Geothermal Steam

| Run No. | Wt. % $H_2O_2$ | Wt. % $NH_4OH$ | Wt. % NaOH | Wt. % Water | Mole Ratios $H_2O_2/H_2S$ | Mole Ratios $NH_4OH/H_2S$ | Mole Ratios $NaOH/H_2S$ | Solution Feed Rate ml/min. | Steam Flow Rate lbs./hr. | Temp. °F. At Chemical Injection Point | Temp. °F. At Muffler | Atmospheric $H_2S$ Abatement* | Solution Injection Characteristic |
|---|---|---|---|---|---|---|---|---|---|---|---|---|---|
| 1 | 1.37 | — | — | 98.63 | 4/1 | — | — | 99 | 117 | 251 | 206 | 7 | spray |
| 3 | 4.80 | — | — | 95.20 | 15.3/1 | — | — | 109 | 119 | 251 | 193 | 33 | spray |
| 4 | 4.80 | — | — | 95.20 | 19/1 | — | — | 110 | 96 | 251 | 192 | 37 | spray |
| 13 | 35.0 | — | — | 65 | 136/1 | — | — | 100 | 102 | 256 | 192 | 56 | drip |
| 14 | 35.0 | — | — | 65 | 225/1 | — | — | 168 | 102 | 256 | 192 | 64 | stream |
| 15 | 35.0 | — | — | 65 | 285/1 | — | — | 215 | 102 | 256 | 192 | 78 | spray |
| 6 | 4.8 | 0.25 | — | 94.95 | 19.8/1 | 1.2/1 | — | 110 | 92 | 250 | 193 | 46 | spray |
| 5 | 4.8 | 0.50 | — | 94.70 | 19.1/1 | 1.9/1 | — | 110 | 96 | 251 | 193 | 36 | spray |
| 7 | 4.8 | 0.125 | — | 95.07 | 19.8/1 | 0.6/1 | — | 110 | 92 | 254 | 184 | 68 | spray |
| 12 | 0 | 0.125 | — | 99.88 | — | 0.6/1 | — | 125 | 93 | 252 | 192 | 15 | stream |
| 19 | 0.6 | — | 0.5 | | 1.9/1 | — | 1.3/1 | 83 | 93 | 253 | 191 | 63 | drip |
| 20 | 0.89 | — | 0.47 | | 2.7/1 | — | 1.2/1 | 83 | 93 | 252 | 183 | 73 | drip |
| 24 | 1.2 | — | 0.24 | | 3.1/1 | — | 0.5/1 | 83 | 93 | 255 | 192 | 58 | drip |
| 25 | 1.2 | — | 0.95 | | 3.8/1 | — | 2.6/1 | 102 | 110 | 252 | 193 | 88 | drip |
| 18 | 1.2 | — | 0.48 | | 5.6/1 | — | 1.9/1 | 125 | 93 | 253 | 191 | 84 | stream |
| 30 | 1.2 | — | 0.95 | | 6.7/1 | — | 3.8/1 | 144 | 110 | 253 | 193 | 96 | stream |
| 31 | 1.2 | — | 0.95 | | 8/1 | — | 4.6/1 | 213 | 110 | 253 | 193 | 96 | spray |

TABLE III-continued

Field Trial on H₂S Abatement in Geothermal Steam

| Run No. | Wt. % H₂O₂ | Wt. % NH₄OH | Wt. % NaOH | Wt. % Water | Mole Ratios H₂O₂/H₂S | Mole Ratios NH₄OH/H₂S | Mole Ratios NaOH/H₂S | Solution Feed Rate ml/min. | Steam Flow Rate lbs./hr. | Temp. °F. At Chemical Injection Point | Temp. °F. At Muffler | Atmospheric H₂S Abatement* | Solution Injection Characteristic |
|---|---|---|---|---|---|---|---|---|---|---|---|---|---|
| 27 | 1.2 | — | 0.95 | | 4/1 | — | 2.3/1 | 112 | 110 | 254 | 193 | 91 | drip |
| 29 | 1.2 | — | 0.95 | | 7.8/1 | — | 4.4/1 | 207 | 110 | 254 | 193 | 93 | spray |
| 22 | — | — | 1.4 | | — | — | 3.1/1 | 83 | 102 | 249 | 189 | 66 | drip |
| 17 | — | — | 0.48 | | — | — | 1.8/1 | 125 | 93 | 256 | 192 | 58 | steam |

*By Drager measurements by welding a metal plate with an 0.5 inch opening on top of the 8 inch muffler opening. The side stream enters a solution of soluble cadmium salt to form insoluble cadmium sulfide. This precipitate is analyzed and calculated back to hydrogen sulfide. The data obtained is summarized in Table III.

Run No. 27 is indicative of the results obtained with the process of the present invention. The sulfide abatement of 91% is achieved using a 2.3:1 mole ratio of sodium hydroxide to sulfide and a 4:1 ratio of hydrogen peroxide to sulfide.

The analysis of the condensate from Run 31 above appears in the following Table IV.

TABLE IV

Analyses of Condensate From Run 31

| | mg/l | Wt. % (of sulfur containing species) |
|---|---|---|
| Free Sulfur | 0.4 | 0.01 |
| Sulfide | 0.3 | 0.009 |
| Sulfite | 0.8 | 0.03 |
| Thiosulfate | 368 | 11.8 |
| Sulfate | 2731 | 88.1 |
| Carbonate | 4250 | |

What is claimed is:

1. A process for removing hydrogen sulfide from geothermal steam which comprises passing geothermal steam containing hydrogen sulfide through a steam pipe at a temperature below 195° C., but not below the boiling point of water at atmospheric pressure, under conditions of turbulent flow and injecting into said steam pipe a base and hydrogen peroxide.

2. The process of claim 1 wherein the basic reagent and hydrogen peroxide are injected as impinging liquid streams.

3. The process of claim 1 wherein the basic reagent and hydrogen peroxide are sprayed into said conduit.

4. The process of claim 1 wherein the hydrogen peroxide is injected as a 50 weight percent solution.

5. The process of claim 1 wherein said base is aqueous ammonium hydroxide.

6. The process of claim 1 wherein said steam is superheated.

7. The process of claim 1 wherein said steam is saturated.

8. The process of claim 1 wherein the mole ratio of hydrogen peroxide to hydrogen sulfide is in the range of from about 4:1 to about 8:1.

9. A process for removing hydrogen sulfide from geothermal steam which comprises passing geothermal steam containing hydrogen sulfide through a steam pipe at a temperature below 195° C., but not below the boiling point of water at atmospheric pressure, under conditions of turbulent flow and simultaneously injecting into said steam pipe a base and hydrogen peroxide.

10. A process for removing hydrogen sulfide from geothermal steam which comprises passing geothermal steam containing hydrogen sulfide through a confined area within a steam pipe at a temperature below 195° C., but not below the boiling point of water at atmospheric pressure, under conditions of turbulent flow and injecting upstream of said confined area a base and hydrogen peroxide.

11. A process for removing hydrogen sulfide from geothermal steam which comprises passing geothermal steam containing hydrogen sulfide at a temperature below 195° C. but not below the boiling point of water at atmospheric pressure through a conduit and injecting into said conduit an alkaline acting reagent and an inorganic peroxygen compound.

12. A process for removing hydrogen sulfide from geothermal steam which comprises passing geothermal steam containing hydrogen sulfide through a conduit and introducing into said conduit an alkaline acting reagent and an inorganic oxidizing agent under conditions sufficient to effect a reduction in the hydrogen sulfide content of said steam.

13. A process for removing hydrogen sulfide from geothermal steam which comprises passing geothermal steam containing hydrogen sulfide through a conduit and introducing into said conduit an alkaline acting reagent and an inorganic peroxygen oxidizing agent under conditions sufficient to effect a reduction in the hydrogen sulfide content of said steam.

14. In the process of removing hydrogen sulfide from geothermal steam employed as an energy source to drive a turbine, and vented to the atmosphere, the improvement which comprises removing a substantial portion of the hydrogen sulfide present in the steam by contacting the steam at a temperature below 195° C., but not below the boiling point of water at atmospheric pressure, under conditions of turbulent flow with hydrogen peroxide and a base.

15. A process for removing hydrogen sulfide from geothermal steam which comprises passing geothermal steam containing hydrogen sulfide at a temperature below 195° C., but not below the boiling point of water at atmospheric pressure, through a steam pipe under conditions of turbulent flow and injecting into said steam pipe a base and an inorganic peroxygen compound.

* * * * *